No. 808,197. PATENTED DEC. 26, 1905.
W. H. DECKER.
AUTOMATIC LUBRICATOR.
APPLICATION FILED JULY 19, 1904.
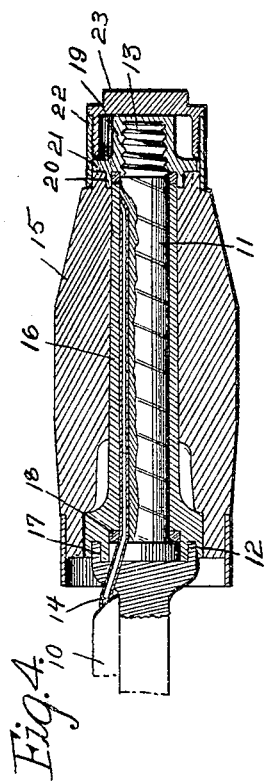
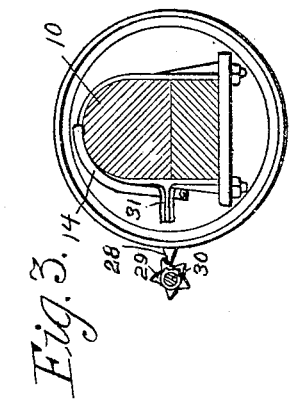
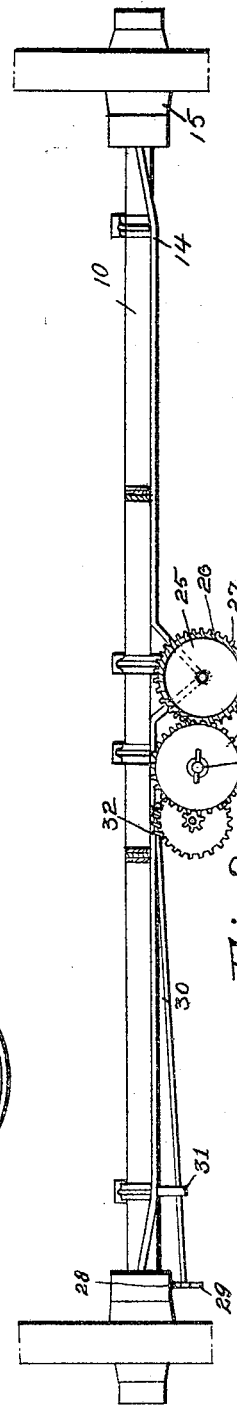
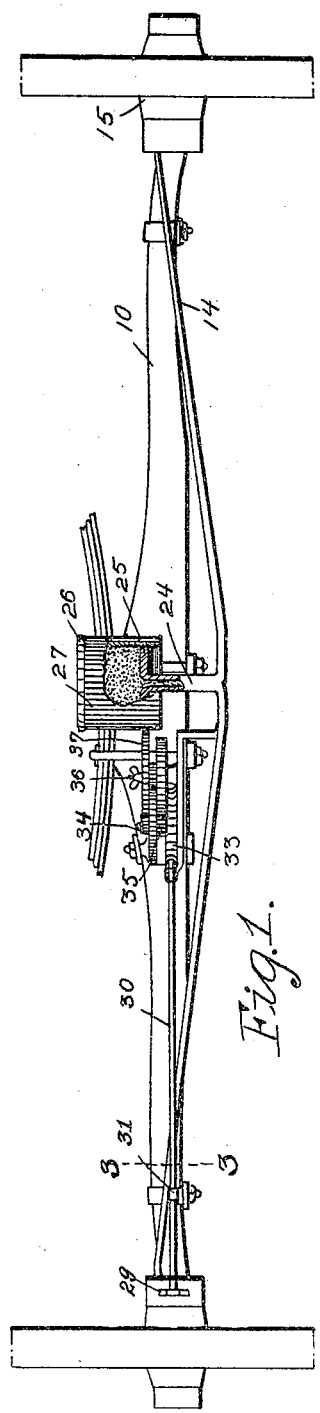
Witnesses
C. G. Hague
R. C. Orwig
Inventor W. H. Decker.
By Orwig & Lane Att'ys

UNITED STATES PATENT OFFICE.

WILLIAM HORACE DECKER, OF DERBY, IOWA.

AUTOMATIC LUBRICATOR.

No. 808,197.          Specification of Letters Patent.          Patented Dec. 26, 1905.

Application filed July 19, 1904. Serial No. 217,185.

*To all whom it may concern:*

Be it known that I, WILLIAM HORACE DECKER, a citizen of the United States, residing at Derby, in the county of Lucas and State of Iowa, have invented a certain new and useful Automatic Lubricator, of which the following is a specification.

The objects of my invention are to provide a device of simple, durable, and inexpensive construction designed to be applied to a vehicle and to contain a quantity of hard oil, said device automatically operated by the advance of the vehicle to distribute quantities of the hard oil to the journals of the axle, said quantity being proportioned to the amount required for lubricating the journals and determined by the extent of use of the vehicle.

My invention consists in the construction, arrangement, and combination of the various parts of the device, whereby the objects contemplated are attained, as hereinafter more fully set forth, pointed out in my claim, and illustrated in the accompanying drawings, in which—

Figure 1 shows a rear end elevation of a vehicle axle and wheels with my attachment applied thereto, part of the oil-receptacle broken away. Fig. 2 shows a top or plan view of same with the oil-receptacle shown in section. Fig. 3 shows an enlarged detail sectional view on the line 3 3 of Fig. 1, and Fig. 4 shows an enlarged longitudinal sectional view of one of the journals with a wheel-hub in position thereon.

Referring to the accompanying drawings, I have used the reference-numeral 10 to indicate the vehicle-axle. On each end of the axle is a journal 11, formed with an outwardly-projecting flange 12 at its inner end and a screw-threaded portion 13 at its outer end. It is also formed with an opening designed to receive a tube 14, the discharge end of which is arranged flush with the surface of the journal near its outer end. Mounted upon the journal is a hub 15 of ordinary construction provided with a boxing 16 to receive the journal. On one end of the boxing 16 is an annular flange 17 to enter the space between the flange 12 and the jaw of the journal 11. This boxing is formed with an annular recess to receive a packing-ring 18. The numeral 19 indicates a nut seated on the screw-threaded portion 13 and formed with an annular rib 20 to project inwardly over a packing-ring 21 on the journal. The numeral 22 indicates a collar fixed to the hub and provided with a screw-threaded portion designed to receive a screw-threaded cap 23 to cover the nut 19. In this way I have provided means for introducing oil to the journal through the tube 14 and for preventing the oil from passing beyond either end of the journal by the packing-rings 18 and 21, and also to prevent the entrance of dust without interfering with the rotation of the hub on the journal.

The tubes 14 from both journals on the axle extend inwardly to the central portion of the axle and unite with each other, and a tube 24 establishes communication between the tubes 14 and a disk-shaped bottom 25, having its periphery provided with screw-threads. Mounted upon the screw-threaded bottom 25 is an oil-cup 26, having a screw-threaded interior and having its exterior provided with teeth 27, extending throughout its entire length vertically. This cup 26 is open at its bottom and closed at its top.

By the arrangement just described the operator may first fill the cup with hard oil, then place the open bottom thereof on the disk-shaped bottom 45, and by turning the cup the top of the cup will be gradually moved downwardly toward the disk-shaped bottom 25, and the contents of the cup will be forced downwardly through the tube 24 and outwardly through the tubes 14 to the journals 11.

I have provided means for rotating the cup 26, as follows: Mounted upon the exterior of the inner end of one of the wheel-hubs is a lug 28. Supported in the path of this lug 28 is a spur-wheel 29, mounted on a shaft 30, which shaft is supported by bearings 31 on the wheel-axle. The other end of the shaft 30 is provided with a worm-gear 32, which worm-gear is in mesh with a worm-wheel 33. This worm-wheel 33 is mounted on the shaft 34, and a small pinion 35 is mounted on the same shaft and is connected with the worm-gear 33. Adjacent to the shaft 34 is a shaft 36, and mounted on these two shafts is a train of pinions arranged to reduce speed. The last pinion of the train is indicated by the numeral 37 and is in mesh with the teeth 27 of the oil-cup.

By means of the mechanism just described every rotation of the hub 15 will cause the spur-wheel 29 to be turned one tooth-space, and motion is transmitted from the shaft 30 to the pinion 37 at a greatly-reduced speed on account of the worm-gears and the train of pinions. The rotation of the pinion 37 will cause the cup 26 to rotate in a direction required for moving the oil-cup downwardly, and, assuming that the oil-cup is full of hard oil, a downward movement of it will force the hard oil through the tube 24 and discharge it to the wheel-axles. By providing teeth running vertically on the exterior of the oil-cup the pinion 37 will engage said teeth throughout the entire downward movement of the oil-cup. In this way oil is distributed to the journals in quantities proportioned to the distance the wheels have traveled, and the oil-distributing tubes are always kept clear and free of obstruction, because the oil is forced through them under great pressure, and dust and other similar obstructions will not clog the oil-tube. When it is desired to refill the oil-cup, it is unscrewed from the base, turned upside down and filled with hard oil, and then again placed on the base and turned down until the screw-threads on its interior firmly engage the screw-threads on the base. Then it is placed in mesh with the pinion 37, and the vehicle is again ready for use.

Having thus described my invention, what I claim, and desire to secure by Letters Patent of the United States therefor, is—

In a device of the class described, comprising a vehicle-axle having a journal thereon, a hub rotatably mounted on the journal, a ferrule at the inner end of the hub, there being a lug on the inner face of said ferrule, a rotatable shaft supported by the axle, a spur-wheel on the shaft in the path of the said lug, a worm-gear on the other end of the shaft, a train of gear-wheels supported on the axle and operated by the said worm-gear, a stationary disk supported on the axle having a screw-threaded periphery, an oil-tube communicating with the interior of the hub and also with said stationary disk, an oil-cup open at its bottom and closed at its top and having a screw-threaded interior to engage the screw-threads on said disk and also having cog-teeth on its exterior in mesh with one of the wheels of said train of gear-wheels, substantially as and for the purposes stated.

WILLIAM HORACE DECKER.

Witnesses:
FLORA M. DECKER,
C. H. DAVIS.